United States Patent
Foedlmeier (10) Patent No.: US 12,170,744 B2
(45) Date of Patent: *Dec. 17, 2024

(54) APPARATUS FOR PROVIDING A CONNECTION TO A WIDE AREA NETWORK FOR VOICE CALLS, A POWER MANAGEMENT CIRCUIT, AND A METHOD FOR PROVIDING A CONNECTION TO A WIDE AREA NETWORK FOR VOICE CALLS

(71) Applicant: Intel Corporation, Santa Clara, CA (US)

(72) Inventor: Dieter Foedlmeier, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,321

(22) Filed: Sep. 25, 2023

(65) Prior Publication Data

US 2024/0114094 A1 Apr. 4, 2024

Related U.S. Application Data

(63) Continuation of application No. 17/477,594, filed on Sep. 17, 2021, now Pat. No. 11,770,480, which is a continuation of application No. 15/935,113, filed on Mar. 26, 2018, now Pat. No. 11,128,756.

(60) Provisional application No. 62/553,213, filed on Sep. 1, 2017.

(51) Int. Cl.
*H04M 7/00* (2006.01)
*H04L 12/12* (2006.01)
*H04L 12/28* (2006.01)
*H04M 3/51* (2006.01)

(52) U.S. Cl.
CPC ............ *H04M 7/006* (2013.01); *H04L 12/12* (2013.01); *H04L 12/2854* (2013.01); *H04L 12/2898* (2013.01); *H04M 7/0069* (2013.01); *H04M 3/5116* (2013.01)

(58) Field of Classification Search
CPC . H04L 12/2854; H04L 12/12; H04L 12/2898; H04M 7/0069; H04M 7/006; H04M 3/5116

See application file for complete search history.

(56) References Cited

U.S. PATENT DOCUMENTS

| | | | |
|---|---|---|---|
| 2004/0202310 A1* | 10/2004 | Li | H04M 1/738 379/381 |
| 2004/0263222 A1* | 12/2004 | Tseng | H03K 17/145 327/143 |
| 2006/0221938 A1* | 10/2006 | Lin | H04L 65/1101 370/352 |

(Continued)

*Primary Examiner* — Chi Ho A Lee
(74) *Attorney, Agent, or Firm* — SPL Patent Attorneys PartG mbB; Yong Beom Hwang (57) ABSTRACT

An apparatus for providing a connection to a wide area network for voice calls includes a wide area network circuit configured to transmit voice call data packets, a phone connection circuit configured to receive a voice call signal from a phone, a processor circuit configured to generate voice call data packets based on a voice call signal received by the phone connection circuit and a power management circuit configured to switch off at least a part of the apparatus to reach a power down mode of the apparatus, if a supply voltage drops below a supply voltage threshold.

20 Claims, 5 Drawing Sheets

(56) References Cited

U.S. PATENT DOCUMENTS

| | | | |
|---|---|---|---|
| 2006/0274764 A1* | 12/2006 | Mah | G06F 1/3287 |
| | | | 370/401 |
| 2010/0180139 A1* | 7/2010 | Denney | H04N 21/4436 |
| | | | 725/111 |
| 2011/0119515 A1* | 5/2011 | Sadwick | G01D 4/002 |
| | | | 713/340 |
| 2014/0280430 A1* | 9/2014 | Kim | G06F 7/53 |
| | | | 708/835 |
| 2015/0146740 A1* | 5/2015 | Yasuda | H04L 49/30 |
| | | | 370/419 |

* cited by examiner

APPARATUS FOR PROVIDING A CONNECTION TO A WIDE AREA NETWORK FOR VOICE CALLS, A POWER MANAGEMENT CIRCUIT, AND A METHOD FOR PROVIDING A CONNECTION TO A WIDE AREA NETWORK FOR VOICE CALLS

CROSS REFERENCE TO RELATED APPLICATIONS

The present application is a continuation of U.S. patent application Ser. No. 17/477,594 filed on Sep. 17, 2021, which is a continuation of U.S. patent application Ser. No. 15/935,113 filed on Mar. 26, 2018, which issued as U.S. Pat. No. 11,128,756 on Sep. 21, 2021, which claims a benefit of U.S. Provisional Application No. 62/553,213 filed on Sep. 1, 2017, the contents of which are incorporated herein by reference in their entirety.

FIELD

Examples relate to concepts for emergency power supply of communication devices and in particular to an apparatus for providing a connection to a wide area network for voice calls, a power management circuit and a method for providing a connection to a wide area network for voice calls.

BACKGROUND

Traditional phone systems require little power to operate. In the past, telephone power was provided and guaranteed by the Central Office (CO). In case of loss of power, such as a power failure during an emergency, the phone would continue to work because it was powered through the CO, as was the case for POTS (Plain Old Telephone Service) and ISDN (Integrated Services Digital Network) services.

With telecommunication becoming more and more digital, the customer premise equipment (CPE) cannot be efficiently powered any longer from the CO as power consumption is too high. Nevertheless, it is still desired to enable an emergency call in case of loss of power.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
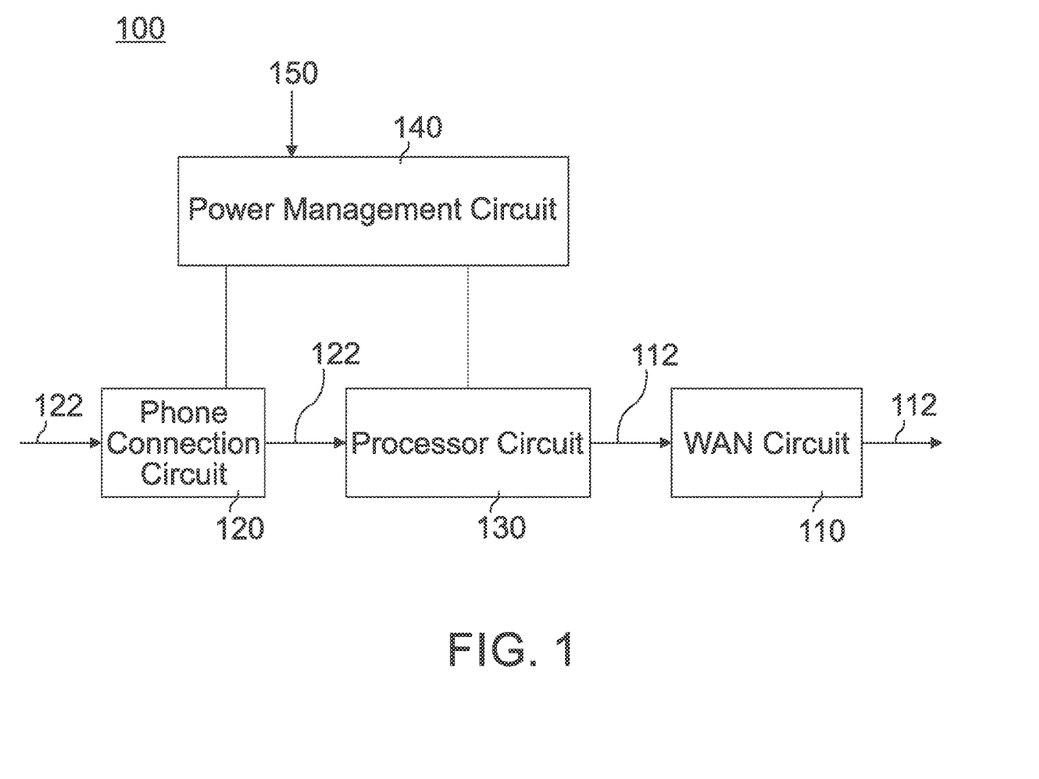
FIG. 1 shows a schematic overview of an apparatus for providing a connection to a wide area network for voice calls.

FIG. 1 shows a schematic overview of an apparatus 100 for providing a connection to a wide area network for voice calls. The apparatus comprises a wide area network (WAN) circuit 110 configured to transmit voice call data packets 112 (e.g. to a communication network or a central office). Further, the apparatus 100 comprises a phone connection circuit 120 configured to receive a voice call signal 122 (e.g. from a phone) and a processor circuit 130 configured to generate voice call data packets 112 based on a voice call signal 122 received by the phone connection circuit 120. Additionally, the apparatus 100 comprises a power management circuit 140 configured to trigger switching off at least a part of the apparatus 100 to reach a power down mode of the apparatus 100, if a supply voltage 150 drops below a supply voltage threshold.

By switching off at least a part of the apparatus to reach a power down mode if a supply voltage drops below a supply voltage threshold, the power consumption of the apparatus may be significantly reduced. In this way, less battery power may be needed to enable basic functions (e.g. emergency calls) of the apparatus.

The apparatus 100 may be Customer Premise Equipment (CPE), a residential gateway, a home gateway, a voice over Internet Protocol (IP) device, and/or a voice over Long-Term Evolution (LTE) device for providing a connection to a wide area network for voice calls.

The wide area network (WAN) circuit 110 may be a circuit configured to transmit voice call data packets 112, such as, for example, a digital subscriber line (DSL) transceiver, cable modem transceiver, passive optical network (PON) transceiver, or wireless transceiver. The wide area network WAN circuit 110 may be a transceiver circuit configured to receive data to be transmitted from the processor circuit. The voice call data packets 112 may be data packets of a voice over IP call.

The phone connection circuit 120 may be a circuit configured to receive a voice call signal 122 from a phone (e.g. an analog phone or digital enhanced cordless telecommunications (DECT) phone), such as, for example, a foreign exchange station (FXS) circuit or a DECT circuit. The voice call signal 122 may be an analog phone signal or a digital phone signal.

The processor circuit 130 may be a circuit configured to generate voice call data packets 112 based on a voice call signal 122 received by the phone connection circuit 120, such as, for example, a network microprocessor and/or a system on chip SoC processor. Voice call data packets may also include the packets to establish and end a voice call, not just voice (speech) data.

The power management circuit 140 may be configured to switch off at least a part of the apparatus to reach a power down mode of the apparatus, if a supply voltage 150 drops below a supply voltage threshold. As long as the supply voltage 150 is above the supply voltage threshold, the apparatus may provide full functionality. If the supply voltage 150 drops below a supply voltage threshold (such as during a power outage), then the power management circuit 140 may trigger switching off at least a part of the apparatus to enter a power down mode in order to minimize power consumption. For example, during the power down mode (or emergency standby mode), the power management circuit 140 may disable power from an emergency supply (e.g. battery) to a part or the complete WAN circuit 110 and/or a part or the complete processor circuit 130. The power management circuit 140 may trigger the switching off at least a part of the apparatus by providing one or more switch control signals (e.g. gate signals of transistors) controlling one or more switches which control the flow of current to a part or the complete WAN circuit 110 and/or a part or the complete processor circuit 130. Alternatively or additionally, the power management circuit 140 may provide one or more power control signals to one or more parts of the apparatus 100 (e.g. the WAN circuit 110 and/or the processor circuit 130) to trigger the one or more parts of the apparatus 100 to switch off one or more parts of the apparatus 100.

During normal operation, the supply voltage may be provided externally through a supply voltage connection of the apparatus 100 from the power grid, for example. If the external power supply drops below a supply voltage threshold (e.g. during a power outage), the apparatus 100 may change into the power down mode. The supply voltage threshold may be below a nominal power supply voltage of the apparatus (e.g. 80% of a nominal power supply voltage).

The power down mode may be a mode of the apparatus 100 with reduced functionality. In the power down mode, the remaining functionalities of the apparatus 100 may be powered by a battery. The apparatus 100 may house the battery or the battery may be connectable to the apparatus 100. For example, the apparatus 100 may still enable emergency calls in the power down mode.

The power management circuit may comprise a voltage detection circuit configured to detect when the supply voltage drops below the supply voltage threshold. Alternatively, the power management circuit 140 may rely on an external meter or monitor to detect when the supply voltage 150 has dropped below the supply voltage threshold. In other words, the power management circuit 140 may monitor the supply voltage 150.

During a power outage or other emergency, there may be a demand for making a phone call. The power management circuit may be configured to trigger switching on an emergency part of the apparatus to change to an emergency call mode of the apparatus, if an emergency call demand is detected. The emergency call demand may be detected by monitoring one or more signals of the various circuit components of the apparatus 100. An emergency call may be any call desired in the power down mode of the apparatus 100. The emergency call may be a call to an emergency number or any other call necessary during a power outage or during a time normal power supply of the apparatus 100 is not possible.

The power management circuit may comprise a current detection circuit configured to detect the emergency call demand, if a current is higher than a current threshold. For example, in the power down mode, the power management circuit may retain a connection to the phone connection circuit. The power management circuit may monitor the phone connection circuit for a signal that may indicate a demand for an emergency call. When the phone is picked up, the power management circuit may detect a change in current (beyond a current threshold) to the phone connection circuit, indicating an emergency call demand.

Once an emergency call demand is detected, the power management circuit may trigger switching on an emergency part of the apparatus to enable an emergency call mode. This may be accomplished by directly controlling the switches which control the flow of current to various system components (e.g. by controlling power to the emergency parts of the apparatus directly). Alternatively or additionally, this may also be accomplished by issuing a signal (e.g. a boot mode emergency mode or normal operation mode signal) while enabling power to the processor, a SoC, and/or other system controller. By issuing a signal such as a boot mode signal, the processor, SoC, and/or other system controller may only boot or enable the appropriate parts of the apparatus 100. For example, if an emergency mode boot signal is given, the system controller (e.g. the processor circuit) may only enable the emergency parts of the apparatus.

The power management circuit 140 may be configured to trigger keeping a non-emergency part of the apparatus switched off in the emergency call mode. In order to minimize energy consumption, the power management circuit may only boot the emergency parts of the apparatus in the emergency call mode as described above. Thus, any non-essential (e.g. non-emergency) parts of the system may remain in the power down mode. This may be accomplished in a manner analogous to enabling the emergency parts of the apparatus: by directly controlling power flow to the various components via the power management circuit itself, or, by issuing an appropriate boot mode signal to the processor or system controller as explained above. In this way, non-emergency parts of the system remain powered down and power consumption may be reduced or minimized.

The apparatus 100 may further comprise at least one of a LAN circuit (e.g. Ethernet circuit and/or WiFi circuit) and data bus circuitry (e.g. Universal Serial Bus USB and/or Serial AT Attachment SATA), which may be part of the non-emergency part of the apparatus. The LAN circuit and/or the data bus circuitry may be switched off in the power down mode and in the emergency call mode of the apparatus 100.

The wide area network circuit 110 may be part of the emergency part of the apparatus. Similarly, the phone connection circuit 120 may comprise a foreign exchange station circuit, wherein the foreign exchange station circuit may be part of the emergency part of the apparatus. For example, when the system is in emergency call mode, the phone connection circuit may be enabled to receive the voice call signal, the WAN circuit may be enabled to transmit the voice call data packets, and the processor circuit may be enabled to convert the phone call signal to voice call data packets.

The processor circuit 130 may be a network microprocessor implemented as system on chip. By implementing the processor circuit as a system on chip, several other components may be implemented on the same semiconductor die. For example, the wide area network WAN circuit 110, the phone connection circuit 120 and/or the power management circuit 140 may be implemented on the same semiconductor die as the processor circuit 130.

The power management circuit 140 may be configured to switch off the system on chip completely in the power down mode. The power management circuit 140 may control power to the processor circuit or system on chip in order to enter power down mode. Alternatively, the power management circuit 140 may issue a standby (or boot down) command to the processor circuit or system on chip in order to enter standby (or a low power mode) in the power down mode.

The power management circuit 140 may be configured to trigger switching on an emergency part of the system on chip in the emergency call mode, while a non-emergency part of the system on chip may be kept switched off. The emergency part of the system on chip may be required for enabling an emergency call. The power management circuit may trigger switching on only the emergency part of the system by issuing a boot mode or similar signal as discussed above. For example, the power management circuit 140 may provide power (e.g. from a battery) and an emergency mode signal to the processor circuit 130 in order to get into the emergency call mode of the apparatus 100. For example, if the power management circuit 140 sends an emergency mode signal to the processor circuit while enabling power to it, then the processor circuit 130 may only enable the emergency parts of the system while the non-emergency parts may be kept switched off.

The apparatus may further comprise a battery. The power management circuit may be powered by the battery in the power down mode. For example, the power management circuit 140 switches to power down mode when the supply voltage has dropped below the supply voltage threshold (e.g. during a power outage) and in order to enable emergency call mode, an alternate source of power is needed. Thus, the power management circuit may switch to being powered by a (rechargeable) battery, generator, or alternative power source while in the power down mode in order to be able to function and enable emergency calling mode.

By enabling power down mode and disabling non-emergency parts of the apparatus, substantial power savings can be achieved. For example, the battery may have an energy capacity of less than 3 Wh (or less than 1 Wh or less than 0.3 Wh). Such a battery may enable to supply standby times of 24 hours and active talk times of 10 minutes. The power management circuit 140 may be configured to connect the battery to the phone connection circuit in the power down mode to enable the detection of an emergency call.

When the supply voltage drops below the threshold, the power management circuit 140 may be no longer able to supply the whole apparatus with the needed power and switches to power down mode. The power management circuit may be configured to disconnect the battery from the processor circuit in the power down mode. In this way, the power management circuit may provide necessary power to monitor the phone connection circuit for an emergency call demand (e.g. by monitoring changes in the current corresponding to a phone being taken off the hook), while simultaneously disabling power to other system components. Until an emergency call demand is detected, there may be no need for the remaining circuits to be active. Both at least a part of the emergency and the non-emergency parts of the system may be powered down until the emergency call demand is detected.

Once an emergency call demand is detected, the power management circuit may enable the emergency parts of the apparatus (e.g. those components needed to make the emergency call). The power management circuit 140 may be configured to connect the battery to the processor circuit in the emergency call mode. In this way, the power management circuit 140 may provide power to the processor circuit 130 (and/or other system on chip and/or system controller) so that the processor circuit can enable the emergency parts of the apparatus (e.g. to receive the voice call signals from the phone connection circuit and process them into voice data packets to be sent by the WAN circuit).

For example, if the supply voltage returns above the supply voltage threshold (e.g. the power outage has ended), then the system does not need to operate in power down or emergency call mode any longer. The power management circuit 140 may be configured to disconnect the battery from the wide area network circuit and the processor circuit, if the supply voltage is above the supply voltage threshold. The power management circuit 140 may also be configured to disconnect the battery from the phone connection circuit or any other emergency parts of the apparatus if the supply voltage is above the supply voltage threshold. The power management circuit 140 may also be configured to connect the battery to the charging circuit.

The wide area network WAN circuit 110, the phone connection circuit 120, the processor circuit 130 and/or the power management circuit 140 may be independent hardware units are may be implemented at least partly together. For example, at least a part of the wide area network WAN circuit 110, at least a part of the phone connection circuit 120, at least a part of the processor circuit 130 and/or at least a part of the power management circuit 140 may be implemented as a system-on-chip device.

Figure 2:
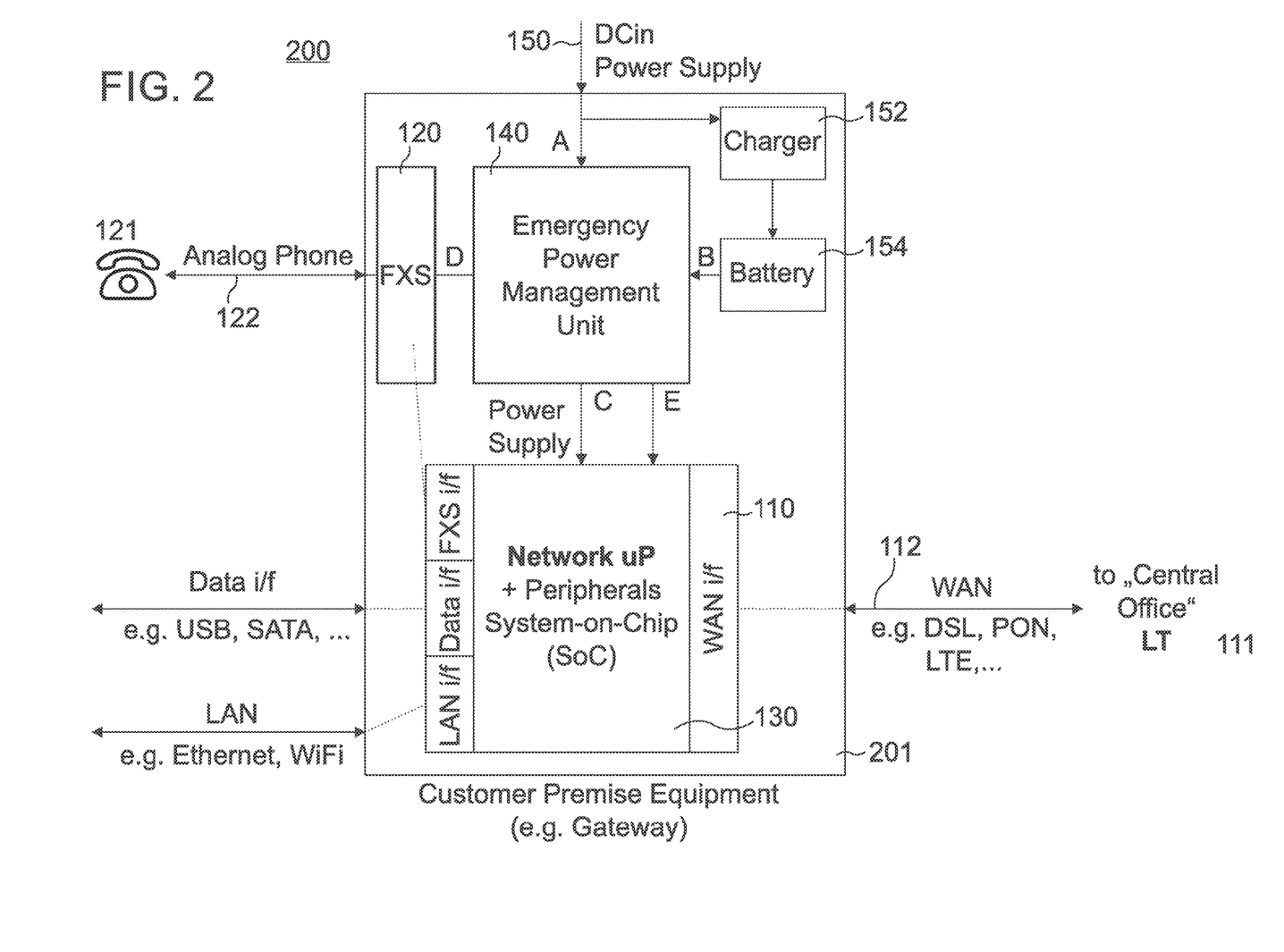
FIG. 2 shows a schematic example of an emergency power management unit integrated into customer premise equipment.

FIG. 2 shows a schematic example of an apparatus 200 with an emergency power management unit integrated into customer premise equipment. The implementation of the apparatus 200 may be similar to the implementation of the apparatus 100 described in connection with FIG. 1. The apparatus 200 comprises a CPE 201 (e.g. a gateway). The CPE 201 comprises a WAN circuit 110, phone connection circuit 120 (comprised of foreign exchange station FXS circuit), a processor circuit 130 (implemented as a System-on-Chip (SoC)), a power management circuit 140, a DCin power supply 150, a charging circuit 152, and a battery 154. The apparatus 200 may further comprise data bus circuitry and/or LAN circuitry.

The WAN circuit 110, the phone connection circuit 120, the data bus circuitry, and/or the LAN circuitry may be implemented within the system on chip, as discrete units within the CPE 201, or as separate discrete devices connected to the CPE 201 by means of the various system interfaces (i/f) in the processor circuit 130 (e.g. WAN i/f, Data i/f, and/or LAN i/f).

The DCin supply voltage 150 provides power via power supply input A to the power management circuit 140 and to the charger station 152. In turn, the charger station 152 charges the rechargeable battery 154, ensuring that the battery is charged should a power outage occur. Should the DCin supply voltage 150 drop below the supply voltage threshold, the battery 154 may be able to provide power via power supply input B to the power management circuit 140.

The phone connection circuit (FXS) 120 is connected to an external analog phone 121. The phone connection circuit 120 is connected to power management circuit 140 through power supply output D.

The processor circuit 130 may be configured to receive voice call signals 122 from the phone connection circuit 120. The processor circuit 130 may process the voice call signals 122 received from the phone connection circuit 120 via analog phone 121. The processor circuit 130 may also comprises a WAN circuit 110 configured to transmit the voice call data packets 112 to a central office 111 by means of a WAN connection. The processor circuit 130 may be connected to the power management circuit 140 by means of power supply output C. In addition, a boot mode signal may be provided to the processor circuit 130 by the power management circuit 140 by means of signal E (e.g. via an input pin).

FIG. 2 shows a possible integration of an emergency power management unit which may reduce the required battery capacity by a factor of 100 or more. This can lead to a cost reduction and/or increase in reliability.

The emergency power management unit may assure minimum power consumption in emergency mode, e.g. when main power supply, and therefore DCin, is off. Further, a minimized battery capacity may be sufficient to guarantee required standby and emergency call durations, e.g. 24 hours standby and 10 minutes emergency call. The circuitry (e.g. Network uP+Peripherals, SoC) may be completely powered off in an emergency mode. A fast "wake-up" of uP and required peripheral may be performed when a phone gets off-hook in emergency mode. For example, the customer may get a dial tone within max. 200 ms (or 500 ms or 1000 ms).

More details and aspects are mentioned in connection with the examples described above or below. The example shown in FIG. 2 may comprise one or more optional additional features corresponding to one or more aspects mentioned in connection with the proposed concept or one or more examples described above (e.g. FIG. 1) or below (e.g. FIGS. 3-5).

Figure 3:
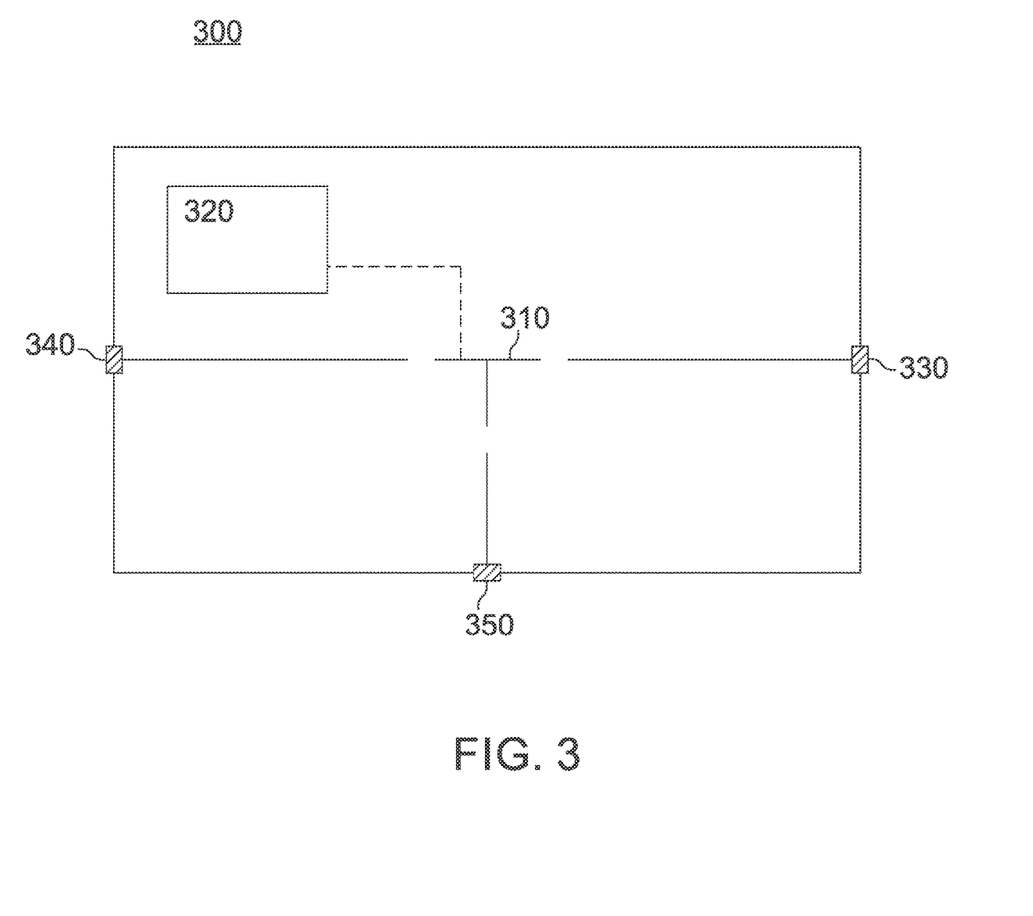
FIG. 3 shows a schematic block diagram of a power management circuit.

FIG. 3 shows a schematic block diagram of a power management circuit 300.

The power management circuit 300 comprises at least one switch 310 and a switch control unit 320 configured to control the at least one switch 310. The power management circuit 300 further comprises a battery contact interface 330 for connecting the power management circuit 300 to a battery (or other power source). The power management circuit 300 further comprises a phone contact interface 340 for connecting the power management circuit 300 to a phone connection circuit. Additionally, the power management circuit 300 comprises a processor contact interface 350 for connecting the power management circuit 300 to a processor circuit. The contact interfaces may be interfaces for establishing an electrical connection to an external circuit (e.g. solder contact points or a plug) or they may be direct electrical connections between the respective components and the power management circuit 300 (e.g. if the power management circuit 300 is integrated into the same package as the other circuitry).

The switch control unit 320 is configured to control the at least one switch 310 to electrically connect the processor contact interface 350 to the battery contact interface if a current through the phone contact interface increases beyond a current threshold. The power management circuit 300 may trigger powering on system components that are otherwise powered down (e.g. the processor circuit) once an emergency call demand is detected. This may be accomplished by controlling the flow of current to the various contact interfaces via the at least one switch 310 by means of the switch control unit 320.

The power management circuit 300 may disconnect power from the processor circuit or other peripherals (through the respective contact interfaces) in order to minimize power consumption. While power is disconnected, the power management circuit 300 may monitor the current flow to the phone connection circuit through the phone contact interface 340. A change in current beyond a current threshold may be a signal that an emergency call demand is desired. In response, the switch control unit 320 may control the at least one switch 310 so as to establish a flow of current to the processor circuit by means of the processor contact interface 350. The system may be kept in a power down mode until an emergency call demand is detected, at which time power may be supplied to an external processor circuit in order to enable an emergency call. The processor circuit may then enable power to any other necessary emergency components (such as a WAN circuit).

The power management circuit may further comprise a WAN contact interface for connecting the power management circuit to a WAN circuit. The switch control unit may be configured to control the at least one switch to connect the WAN contact interface to the battery contact interface if the current through the phone contact interface increases beyond a current threshold. In other words, the power management circuit may be able to power the WAN circuit directly.

In some examples, the battery may further comprise a charging contact interface for connecting the battery to a charging circuit.

More details and aspects are mentioned in connection with the examples described above or below. The example shown in FIG. 3 may comprise one or more optional additional features corresponding to one or more aspects mentioned in connection with the proposed concept or one or more examples described above (e.g. FIG. 1-2) or below (e.g. FIGS. 4-5).

Figure 4:
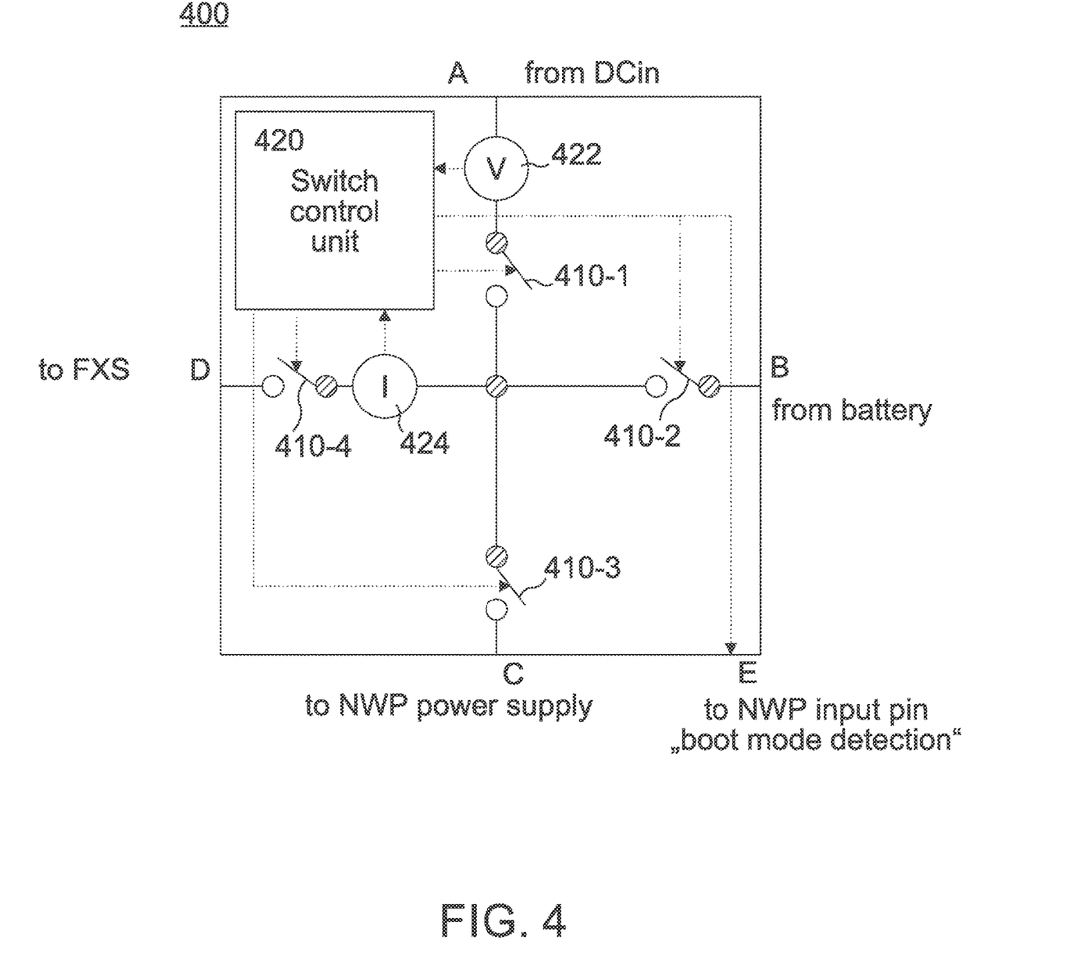
FIG. 4 shows an example of a power management circuit.

FIG. 4 shows a schematic example of a power management circuit 400 according to an example. The implementation of the power management circuit 400 may be similar to the implementation of the power management circuit 130 described in connection with FIGS. 1-2 or the power management circuit 300 described in connection with FIG. 3. FIG. 4 shows a more detailed schematic of an emergency power management unit EPMU with 4 supply ports A, B, C, and D, where A and B are inputs, C and D are outputs and a fifth signaling port E indicating the operational mode (e.g. normal operation or emergency mode). It includes 4 switches 410 which are controlled by a switch control unit 420. The number of switches might vary in different implementations.

The power management circuit 400 comprises switches 410 (individually labeled as switches 1, 2, 3, and 4) and switch control unit 420 configured to control the switches 410. The power management circuit 400 further comprises a DCin contact interface A for connecting power management circuit 400 to a supply voltage, a battery contact interface B for connecting the power management circuit 400 to a battery, a processor contact interface C for connecting the power management circuit 400 to a processor circuit, and a phone contact interface D for connecting the power management circuit 400 to a phone connection circuit. The power management circuit 400 may further comprise an output signal E for providing a boot mode signal (or an un-boot or boot down signal) to the processor circuit. The power management circuit has two power supply in lines (A and B) and two power supply out lines (C and D).

The power management circuit 400 may also comprise a voltage sensor 422 (e.g. a voltmeter or voltage tester) and/or a current sensor 424 (e.g. a resistor). The voltage sensor 422 may monitor the incoming supply voltage from input A. When the supply voltage is greater than a supply voltage threshold (e.g. $V>V_{limit}$), the power management circuit 400 is in normal operation mode (e.g. the gateway is operated from the main power supply). When the supply voltage is below a supply voltage threshold (e.g. $V<V_{limit}$), the power management circuit 400 enters the emergency operation mode (e.g. gateway is operated from battery and only allows outgoing emergency calls). In the emergency operation mode, the current sensor 424 gets into operation.

In other words, if the supply voltage drops below the supply voltage threshold, then the power management circuit 400 switches from normal operation to Emergency Stand-by mode by disabling the power connections from the supply in (switch 1) and processor circuit (switch 3), while enabling power connections from the battery (switch 2) and to the phone connection circuit (switch 4). Simultaneously, the current detector 424 is activated, monitoring the phone connection interface for an emergency call demand. In this way, the system switches from normal operation to an emergency stand-by mode where the analog phone is monitored for a change in current (e.g. an emergency call demand). Prior to disabling the connection to the processor circuit, the boot-mode signal may be used to power down the processor circuit and/or other circuit components (e.g. related or unused signals) in a controlled manner. For example, rather than simply cutting power to the processor circuit (which may lead to memory damage or a malfunction on reboot), the power management circuit may issue a boot down command to the processor circuit.

This is summarized in the table below. The switch control unit 420 controls the switches 410, for example, according to the table below, where V and I represent the reading of the voltage sensor 422 and current sensor 424, respectively.

processor gets powered into the "Emergency Active" mode, it can detect by port E, that only a very limited emergency mode operation is required, where only communication between FXS and WAN port is supported. Therefore only a limited feature set may be enabled and boot-up can be made very quickly, e.g. execution out of flash.

In other words, under normal operation, the system is in state '11' with switches 1 and 3 ON and switches 2 and 4 OFF. In normal operation mode, power is provided to the various circuitry through the power management circuit by means of the DCin supply voltage. In the example shown in the table above, the battery and phone connection circuit may be disconnected (e.g. their respective switches, 2 and 4, are turned OFF) while in normal operation mode. In other examples, the phone connection and FXS circuitry may continue operating in normal operation mode (e.g. switch 4 may remain ON in state '11'). In some examples, the current detection sensor 424 may be integrated in the phone connection circuit and/or FXS.

Should the DCin supply voltage drop ($V<V_{limit}$), then the system switches to an "Emergency Stand-by" mode. In this mode, the power management circuit 400 turns switch 3 OFF to disable power to the processor circuit and other peripherals, conserving power. Simultaneously, the power management circuit turns switches 2 and 4 ON, enabling battery power to the phone connection circuit (and to an external analog phone). The power management circuit 400 monitors current detector 424 for a change in the current beyond the current threshold.

If there is no change in the current I (e.g. $I<I_{limit}$) then the system remains in the power down mode conserving power. An emergency call demand is detected once a change in the current is detected (e.g. $I>I_{limit}$, for example corresponding to a phone being picked up off the hook). Once the emergency call demand is detected, the power management circuit 400 switches to "Emergency Active" mode. In this mode, switch control unit 420 turns switch 3 ON, enabling power to the processor circuit. The switch control unit 420 may also send a boot mode signal via port E to the processor circuit so that the processor circuit boots only the emergency parts of the system (e.g. those parts needed to complete the call, such as the phone connection circuit, the WAN circuit, and the processor circuit) while keeping non-emergency parts of the system off (such as data bus circuitry or LAN circuitry). Thus, the emergency parts of the system are only turned on when an emergency call demand is detected. The rest of the time the system is in power down mode (emergency stand-by mode) and system power is conserved.

More details and aspects are mentioned in connection with the examples described above or below. The example

|  |  | State | Switch 1 | Switch 2 | Switch 3 | Switch 4 | State Name |
|---|---|---|---|---|---|---|---|
| $V > V_{limit}$ | I = don't care | 11 | ON | OFF | ON | OFF | Normal Operation |
|  |  | 10 |  |  |  |  |  |
| $V < V_{limit}$ | $I < I_{limit}$ | 00 | OFF | ON | OFF | ON | Emergency Stand-By |
|  | $I > I_{limit}$ | 01 | OFF | ON | ON | ON | Emergency Active |

In state '00' the network processor and its peripherals are not powered (switch 3 is OFF), but the phone connection circuit (FXS) remains powered through the battery (switches 2 and 4 are ON). In state '01' the switch control unit 420 detects, for example, a so-called Off-Hook state by detecting a current that is higher than a specified limit. If the network shown in FIG. 4 may comprise one or more optional additional features corresponding to one or more aspects mentioned in connection with the proposed concept or one or more examples described above (e.g. FIG. 1-3) or below (e.g. FIG. 5).

Figure 5:
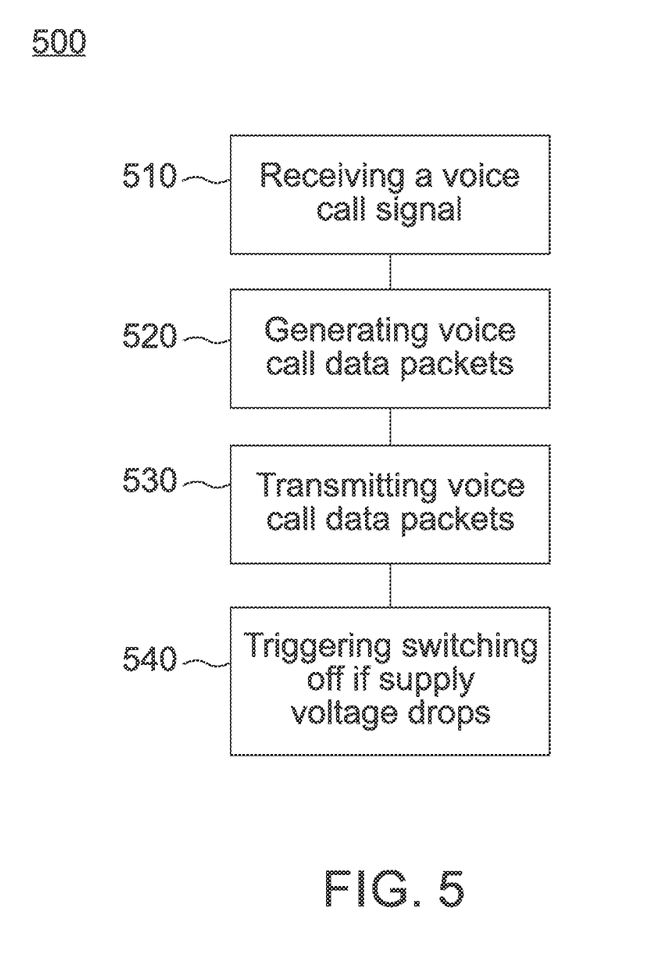
FIG. 5 shows a flowchart of a method for providing a connection to a wide area network for voice calls

FIG. 5 shows a flowchart of a method 500 for providing a connection to a wide area network for voice calls.

The method 500 may comprise 510 receiving a voice call signal from a phone by a phone connection circuit. The method 500 may further comprise 520 generating voice call data packets by a processor circuit based on the voice call signal received by the phone connection circuit. The method 500 may further comprise 530 transmitting voice call data packets by a wide area network circuit based on the voice call data packets generated by the processor circuit. Additionally, the method 500 may comprise 540 switching off at least one of the processor circuit and the WAN circuit, if a supply voltage drops below a supply voltage threshold. Thus, if an input supply voltage drops below a supply voltage threshold (e.g. during a power outage), the processor circuit and/or the WAN circuit may be powered down to conserve any remaining sources of power.

The method 500 may further comprise triggering switching on at least a part of the processor circuit and WAN circuit to change to an emergency call mode if an emergency call demand is detected. In other words, if the supply voltage drops below the supply voltage threshold and the circuits are powered down, the system may monitor for a change of current corresponding to an emergency call demand. Once an emergency call demand is detected, the emergency parts of the system (e.g. the processor circuit and WAN circuit necessary to complete an outgoing call) may be powered on temporarily. In this way, an emergency call may be enabled when an emergency call demand is detected. If no emergency call demand is detected, then the system reverts to power down mode, conserving power.

More details and aspects are mentioned in connection with the examples described above or below. The example shown in FIG. 5 may comprise one or more optional additional features corresponding to one or more aspects mentioned in connection with the proposed concept or one or more examples described above (e.g. FIGS. 1-4).

Some examples may relate to a computer-readable storage device comprising executable instructions that, in response to execution, cause one or more processors of an apparatus for providing a connection to a wide area network for voice calls to perform operations, the operations comprising receiving a voice call signal from a phone by a phone connection circuit; generating voice call data packets by a processor circuit based on the voice call signal received by the phone connection circuit; transmitting voice call data packets by a wide area network circuit; and switching off at least one of the processor circuit and the wide area network circuit, if a supply voltage drops below a supply voltage threshold.

Some examples relate to emergency power management for supporting lifeline (e.g. US 911) in customer premises equipment CPE.

A proposed system may need very low power in power down situations so that a small battery may be sufficient. To support lifeline for other CPEs rechargeable batteries may be required with a capacity of about 30 Wh in order to achieve for example reasonable standby time of 24 h and 10 minute active '911' emergency call.

The aspects and features mentioned and described together with one or more of the previously detailed examples and figures, may as well be combined with one or more of the other examples in order to replace a like feature of the other example or in order to additionally introduce the feature to the other example.

In the following, examples pertain to further examples.

Example 1 is an apparatus for providing a connection to a wide area network for voice calls, the apparatus comprising: a wide area network circuit configured to transmit voice call data packets; a phone connection circuit configured to receive a voice call signal from a phone; a processor circuit configured to generate voice call data packets based on a voice call signal received by the phone connection circuit; and a power management circuit configured to trigger switching off at least a part of the apparatus to reach a power down mode of the apparatus, if a supply voltage drops below a supply voltage threshold.

In example 2, the subject matter of example 1 may optionally include the power management circuit being configured to trigger switching on an emergency part of the apparatus to change to an emergency call mode of the apparatus, if an emergency call demand is detected.

In example 3, the subject matter of any of examples 1-2 may optionally include the power management circuit being configured to trigger keeping a non-emergency part of the apparatus switched off in the emergency call mode.

In example 4, the subject matter of any of examples 1-3 may optionally include at least one of a LAN circuit and data bus circuitry, which are part of the non-emergency part of the apparatus.

In example 5, the subject matter of any of examples 1-4 may optionally include the wide area network circuit being part of the emergency part of the apparatus.

In example 6, the subject matter of any of examples 1-5 may optionally include the phone connection circuit comprising a foreign exchange station circuit, wherein the foreign exchange station circuit is part of the emergency part of the apparatus.

In example 7, the subject matter of any of examples 1-6 may optionally include the power management circuit or the phone connection circuit comprising a current detection circuit configured to detect the emergency call demand, if a current is higher than a current threshold.

In example 8, the subject matter of any of examples 1-7 may optionally include the processor circuit comprising a network microprocessor implemented as system on chip.

In example 9, the subject matter of example 8 may optionally include the power management circuit being configured to trigger the system on chip to enter standby or to switch off completely in the power down mode.

In example 10, the subject matter of any of examples 8-9 may optionally include the power management circuit being configured to trigger switching on an emergency part of the system on chip in the emergency call mode, while a non-emergency part of the system on chip is kept switched off, wherein the emergency part of the system on chip is required for enabling an emergency call.

In example 11, the subject matter of any of examples 1-10 may optionally include a battery, wherein the power management circuit is powered by the battery in the power down mode.

In example 12, the subject matter of example 11 may optionally include the battery having an energy capacity of less than 3 Wh.

In example 13, the subject matter of any of examples 11-12 may optionally include the power management circuit being configured to connect the battery to the phone connection circuit in the power down mode.

In example 14, the subject matter of any of examples 11-13 may optionally include the power management circuit being configured to disconnect the battery from the processor circuit in the power down mode.

In example 15, the subject matter of any of examples 11-14 may optionally include the power management circuit being configured to connect the battery to the processor circuit in the emergency call mode.

In example 16, the subject matter of any of examples 11-15 may optionally include the power management circuit being configured to disconnect the battery from the wide area network circuit and the processor circuit, if the supply voltage is above the supply voltage threshold.

In example 17, the subject matter of any of examples 1-16 may optionally include the power management circuit comprising a voltage detection circuit configured to detect when the supply voltage drops below the supply voltage threshold.

Example 18 relates to a power management circuit comprising: at least one switch; a switch control unit configured to control the at least one switch; a battery contact interface for connecting the power management circuit to a battery; a phone contact interface for connecting the power management circuit to a phone connection circuit; a processor contact interface for connecting the power management circuit to a processor circuit; wherein the switch control unit is configured to control the at least one switch to connect the processor contact interface to the battery contact interface if a current through the phone contact interface increases beyond a current threshold.

In example 19, the subject matter of example 18 may optionally include a wide area network contact interface for connecting the power management circuit to a wide area network circuit, wherein the switch control unit is configured to control the at least one switch to connect the wide area network contact interface to the battery contact interface if the current through the phone contact interface increases beyond a current threshold.

Example 20 relates to a method for providing a connection to a wide area network for voice calls, the method comprising: receiving a voice call signal from a phone by a phone connection circuit; generating voice call data packets by a processor circuit based on the voice call signal received by the phone connection circuit; transmitting voice call data packets by a wide area network circuit; and triggering switching off at least one of the processor circuit and the wide area network circuit, if a supply voltage drops below a supply voltage threshold.

In example 21, the subject matter of example 20 may optionally include triggering switching on at least a part of the processor circuit and wide area network circuit to change to an emergency call mode if an emergency call demand is detected.

Example 22 relates to a computer-readable storage device comprising executable instructions that, in response to execution, cause one or more processors of an apparatus for providing a connection to a wide area network for voice calls to perform operations, the operations comprising: receiving a voice call signal from a phone by a phone connection circuit; generating voice call data packets by a processor circuit based on the voice call signal received by the phone connection circuit; transmitting voice call data packets by a wide area network circuit; and switching off at least one of the processor circuit and the wide area network circuit, if a supply voltage drops below a supply voltage threshold.

Example 23 is an apparatus for providing a connection to a wide area network for voice calls, the apparatus comprising: means for transmitting voice call data packets; means for receiving a voice call signal from a phone; means for generating voice call data packets based on a voice call signal received by the means for receiving a voice call signal; and means for power management triggering switching off at least a part of the apparatus to reach a power down mode of the apparatus, if a supply voltage drops below a supply voltage threshold.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub—acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for providing a connection to a wide area network for voice calls, the apparatus comprising:
   a network circuit configured to transmit voice call data packets;
   a phone connection circuit configured to receive a voice call signal;
   a processor circuit configured to generate voice call data packets based on a voice call signal received by the phone connection circuit; and
   a power management circuit configured to issue a command to the processor circuit to transition the processor circuit to at least one of a power down mode or a low power mode if a supply voltage supplied from an external power source does not satisfy a supply voltage threshold,
   wherein the power management circuit is powered by a battery when the supply voltage from the external power source does not satisfy the supply voltage threshold.

2. The apparatus according to claim 1, wherein the power management circuit is configured to trigger switching on an emergency part of the apparatus to change to an emergency call mode of the apparatus, if an emergency call demand is detected.

3. The apparatus according to claim 2, wherein the power management circuit is configured to trigger keeping a non-emergency part of the apparatus switched off in the emergency call mode.

4. The apparatus according to claim 3, further comprising at least one of a LAN circuit and data bus circuitry, which are part of the non-emergency part of the apparatus.

5. The apparatus according to claim 2, wherein the network circuit is part of the emergency part of the apparatus.

6. The apparatus according to claim 2, wherein the phone connection circuit comprises a foreign exchange station circuit, wherein the foreign exchange station circuit is part of the emergency part of the apparatus.

7. The apparatus according to claim 2, wherein the power management circuit or the phone connection circuit comprise a current detection circuit configured to detect the emergency call demand, if a current is higher than a current threshold.

8. The apparatus according to claim 1, wherein the processor circuit comprises a network microprocessor implemented as system on chip.

9. The apparatus according to claim 8, wherein the power management circuit is configured to trigger the system on chip to enter standby or to switch off completely in the power down mode.

10. The apparatus according to claim 8, wherein the power management circuit is configured to trigger switching on an emergency part of the system on chip in the emergency call mode, while a non-emergency part of the system on chip is kept switched off, wherein the emergency part of the system on chip is required for enabling an emergency call.

11. A computer-readable storage device comprising executable instructions that, in response to execution, cause one or more processors of an apparatus for providing a connection to a wide area network for voice calls to perform operations, the operations comprising:
    generating voice call data packets by a processor circuit based on the voice call signal received by the phone connection circuit;
    preparing for transmission voice call data packets by a network circuit; and
    switching off at least part of the network circuit and/or issuing a command to the processor circuit to transition the processor circuit to a power down mode or a low power mode, if a supply voltage provided from an external power source drops below a supply voltage threshold, wherein the supply voltage is provided from a battery while the supply voltage from the external power source does not satisfy the supply voltage threshold.

12. The device of claim 11, further comprising triggering switching on at least a part of the processor circuit and network circuit to change to an emergency call mode if an emergency call demand is detected.

13. The device according to claim 12, wherein the power management circuit is configured to trigger keeping a non-emergency part of the device switched off in the emergency call mode.

14. The device according to claim 13, further comprising at least one of a LAN circuit and data bus circuitry, which are part of the non-emergency part of the device.

15. The device according to claim 12, wherein the network circuit is part of the emergency part of the device.

16. The device according to claim 12, wherein the phone connection circuit comprises a foreign exchange station circuit, wherein the foreign exchange station circuit is part of the emergency part of the device.

17. The device according to claim 12, wherein the power management circuit or the phone connection circuit comprise a current detection circuit configured to detect the emergency call demand, if a current is higher than a current threshold.

18. The device according to claim 11, wherein the processor circuit comprises a network microprocessor implemented as system on chip.

19. The device according to claim 18, wherein the power management circuit is configured to trigger the system on chip to enter standby or to switch off completely in the power down mode.

20. The device according to claim 18, wherein the power management circuit is configured to trigger switching on an emergency part of the system on chip in the emergency call mode, while a non-emergency part of the system on chip is kept switched off, wherein the emergency part of the system on chip is required for enabling an emergency call.

* * * * *